United States Patent Office 3,849,444
Patented Nov. 19, 1974

---

3,849,444
PRODUCTION OF BUTANEDIOLFORMAL
Hugo Fuchs, Ludwigshafen (Rhine), Ernst Ricker, Frankenthal, Pfalz, Franz Schmidt and Erich Schwartz, Mannheim, and Heinrich Sperber, Ludwigshafen (Rhine), Germany, assignors to Badische Anilin- & Soda-Fabrik Aktiengesellschaft, Ludwigshafen (Rhine), Germany
Continuation of abandoned application Ser. No. 762,928, Sept. 26, 1968. This application May 3, 1971, Ser. No. 139,922
Claims priority, application Germany, Sept. 29, 1967, P 16 43 248.7
Int. Cl. C07d 17/00
U.S. Cl. 260—338     3 Claims

ABSTRACT OF THE DISCLOSURE

A process for the production of 1,4-butanediolformal:

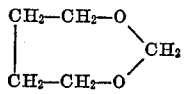

Figure 1:
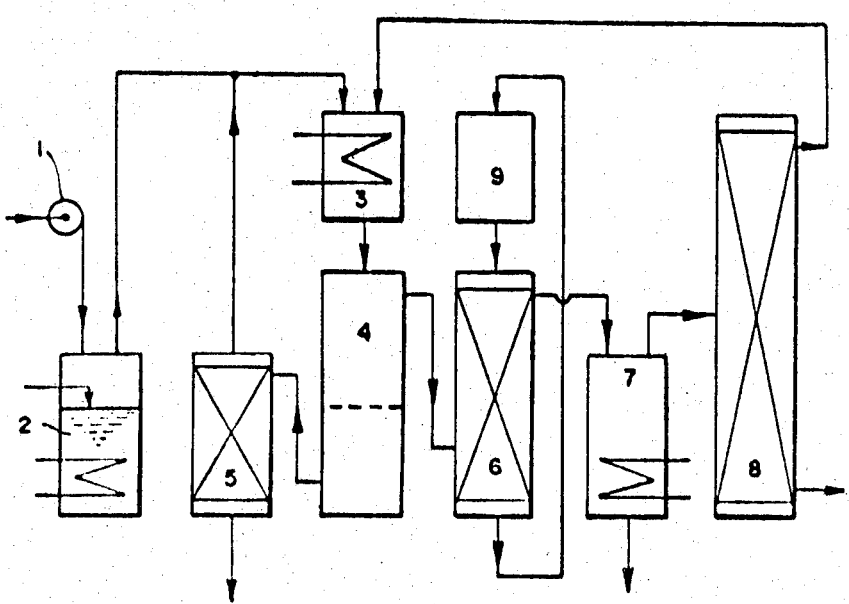

with a high space-time yield and particularly low formation of by-products by continuous reaction of butanediol-(1,4) with aqueous formaldehyde solutions in the presence of small amounts of acid catalysts.

---

This invention relates to a process for the production of butanediolformal (also known as 1,3-dioxepane) from butanediol-(1,4) and formaldeyhde in the presence of acids or hydrogen ion donors.

The production of cyclic formals from diols and formaldehyde in the presence of acids is known (cf. for example D. Weichert, Plaste und Kautschuk 10, 579 et seq., (63)). It is also known that particularly the mixture of butanediolformal and water recovered by distillation from the synthesis vessel separates into two layers which have a different content of butanediolformal. Finally it is known that butanediolformal can be dehydrated by salting out or alkali treatment.

A product which has a particularly high purity necessary for the polymerization or copolymerization with trioxane is not obtainable by these measures alone. In particular, tetrahydrofuran is formed, sometimes in considerable amounts, in the known synthesis. There is no indication in the literature as to how the formation of these troublesome byproducts can be suppressed.

It is the object of this invention to provide an economical process which substantially avoids the formation of by-products.

We have now found that 1,4-butanediolformal can be obtained in very good yields and high purity by reaction of butanediol-1,4 and an aqueous solution of formaldehyde or a substance yielding formaldehyde in the presence of acids or acid salts in a heated reaction vessel by continuously (a) carrying out the reaction with an amount of reaction mixture which is kept constant and which contains less than 1% of a strong acid or less than 10% of an acid salt or a weak acid,
(b) evaporating the product of the synthesis so that a mean residence time of less than 240 minutes is set up for the reaction mixture,
(c) either
(c¹) separating the two layers which form after condensation of the synthesis vapor, separating 1,4-buanediolformal dissolved in the water-rich layer by azeotropic distillation and returning it to the reaction vessel or
(c²) passing the synthesis vapor uncondensed into the middle portion of a rectification column and condensing the azeotrope of butanediolformal and water leaving the top of the column and allowing it to separate into two phases and
(d) subjecting the upper layer (containing the bulk of 1,4-butanediolformal) to treatment with alkali and fractionally distilling it.

The synthesis vessel in the simplest case is a distillation flask; in a preferred embodiment of the synthesis a recirculating evaporator is used as the reactor.

The invalidity or validity of Ostwald's dilution law is determinative for the definitions "strong acid" and "weak acid" (cf. for example Eucken-Wicke, Grundiss der physikalischen Chemie, 10th edition, Leipzig 1959, pages 210 et seq. and page 212).

Either strong acids in concentration of less than 1, particularly from 0.005 to 0.5% or weak acids or acid salts in concentrations of less than 10, particularly from 0.1 to 5%, based on the amount of reaction mixture are used according to this invention. Examples of strong acids are sulfuric acid, p-toluenesulfonic acid, perchloric acid, hydrogen chloride. Orthophosphoric acid or polyphosphoric acids are particularly suitable weak acids and potassium or sodium hydrogen sulfate, potassium or sodium dihydrogen phosphate or alums are particularly suitable acid salts; the maximum concentration of the catalysts used according to this invention may be determined by their solubility in the reaction mixture.

After the synthesis vapors which distil off have been condensed, they separate into two phases. The heavier phase contains, in addition to water, about 15 to 20% of butanediolformal. The lighter phase contains the bulk of the butanediolformal. The heavier phase is supplied continuously to an azeotropic distillation unit, the butanediolformal contained therein being separated and recycled.

The upper phase is subjected to a treatment with alkali or alkaline earth and then distilled continuously.

Concentrated aqueous solutions of sodium hydroxide or potassium hydroxide are preferred as alkalies and in an advantageous embodiment they are allowed to form from solid alkali metal hydroxide and the water contained in the butanediolformal in a stirred vessle 9 arranged on top of the scrubbing column. The supply of caustic alkali solution to the top of the column is advantageously regulated so that the liquor withdrawn at the bottom of the column has an alkali metal hydroxide content of more than 10%, preferably from about 12 to 20%, by weight. This may be used again, after it has been concentrated, for drying the azeotrope.

The treatment with alkaline liquor, which if desired may also be carried out with other basic alkali metal or alkaline earth metal compounds or their solutions, has the advantage that not only water but other impurities of the butanediolformal, for example formic acid and formaldehyde, are effectively removed.

It is also possible to remove the bulk of the water in an upstream scrubbing column or in a stirred vessel by salting out for example with common salt or by means of drying agents, such as calcium chloride or sodium sulfate, prior to the treatment with alkaline liquors. After the treatment with alkaline liquors it is possible to carry out afterdrying, for example with molecular sieves, with silica gel or other known desiccants which are inert to butanediolformal. These additional measures are however not generally necessary.

Apparatus which it is preferred to use for the process according to this invention is shown diagrammatically in FIG. 1. The reaction mixture is supplied at 1 to a heated reactor 2; the rate of evaporation is controlled by way of the heat load so that a mean residence time of the reaction mixture of from fifteen minutes to four hours, preferably from fifteen minutes to two hours, is set up. The vaporous reaction products are condensed in a condenser 3. After the layers have separated in separation vessel 4, the butanediolformal dissolved in the phase having a high content of water is distilled off azeotropically with 25 to 30% of water from this phase, for example in a heat exchanger 5 which may be heated with steam. Condensation of these vapors may advantageously take place together with that of the synthesis vapors in 3. Water and less than 1% of butanediolformal remain as distillation residue. This bottoms is discharged as a liquid at the bottom of 5 continuously or periodically.

In the column 6 the lighter condensate layer which consists substantially of butanediolformal is treated with alkali. The pre-purified crude formal is evaporated in 7 and less volatile constituents are at the same time separated in liquid form. The vapors are supplied to a fractionation column 8. Pure butanediolformal having a water content of less than 50 p.p.m. is withdrawn at the bottom of the column. The vapors at the top of the column contain all the impurities. They may be recycled wholly or partly in gaseous or condensed condition.

Figure 2:
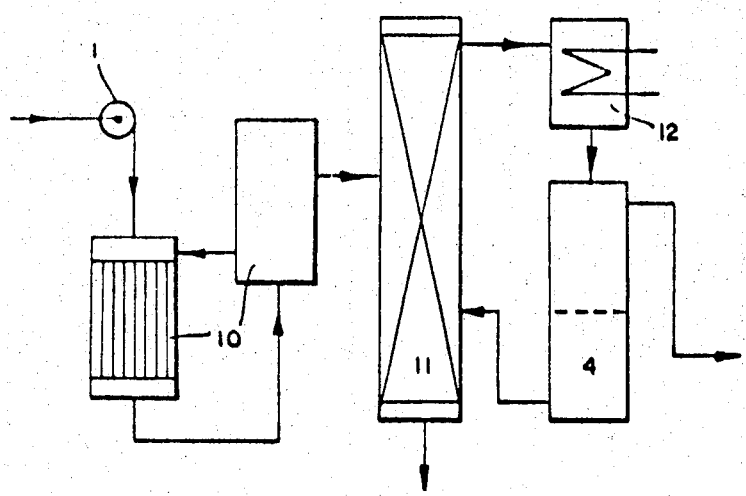

A particularly favorable embodiment of the apparatus is shown in FIG. 2. This has as the reactor a recirculating evaporator 10. Synthesis vapor formed therein is supplied uncondensed to the middle portion of a rectifying column 11. The azeotrope obtained at 88° to 90° C. at the top of the column is condensed at 12 and separated into two phases in 4. The water-rich phase flows back continuously into the lower portion of the column. The contents of the bottom consist at a temperature of 95° to 105° C. mainly of water with less than 0.5% butanediolformal. It is continuously discharged.

The advantage of the use of a recirculating evaporator consists in the fact that relatively large conversions can be achieved with relatively small reaction volumes, i.e. high space-time yields can be obtained. The residence times in the recirculating evaporator may be from one to sixty minutes, advantageously from ten to forty minutes.

The invention is illustrated by the following Examples. The parts and percentages referred to in the Examples are by weight unless otherwise stated. Parts by volume bear the same relation to parts by weight as the liter to the kilogram.

EXAMPLE 1

In a pilot plant of the type described having a reactor with a capacity of 6 parts by volume, 4 parts of a mixture of equal parts of butanediol-(1,4) and a 35% aqueous formaldehyde solution is introduced, 2% of phosphoric acid is added and the whole heated. The heat load is regulated so that 1.4 parts per hour of distillate is obtained at a reaction temperature of 170° to 180° C.; the distillate is further processed in the manner described. The starting mixture is continuously replenished via a pump so that the level remains constant and so that there is a mean residence time of 170 minutes.

After a start-up period of three hours, 0.72 part (i.e. 90% of the story) of a particularly pure butanediolformal having less than 50 p.p.m. of water is obtained which can be used for the polymerisation. 3% of tetrahydrofuran is formed as a by-product.

EXAMPLE 2

1.2 parts of a mixture of 0.57 part of butanediol-(1,4), 0.63 part of a 30% aqueous formaldehyde solution and 0.0018 part of concentrated sulfuric acid, equivalent to 0.15%, are introduced into the pilot plant described but with a recirculating evaporator as the reactor, and the amount thereof is kept constant in the manner described. At a residence time of 36 minutes, corresponding to 2 parts of distillate per hour, determined by the heat load, 1.1 parts of crude formal is obtained in continuous operation and is worked up into pure product as described above.

EXAMPLES 3 TO 6

The procedure described in Example 2 is followed but the concentration of catalyst in the reactor is varied in the manner indicated in Table 1. For comparison a conventional acid concentration is used in Example 3.

The following abbreviations are used in the Tables: E=Example No.; T=type; Am=amount in percent; RT=residence time in minutes; BDF=butanediolformal percent; THF=tetrahydrofuran percent; C=comparison.

TABLE 1

| E | Catalyst T | Am (percent) | RT (min.) | Yield (percent) BDF | THF |
|---|---|---|---|---|---|
| 1 | H₃PO₄ | 2.0 | 170 | 90 | 3 |
| 2 | H₂SO₄ | 0.15 | 36 | 95.8 | 3 |
| 3C | H₂SO₄ | 2.0 | 36 | 87.0 | 10.2 |
| 4 | KHSO₄ | 0.25 | 36 | 96.2 | 1.8 |
| 5 | K(Al(SO₄)₂) | 0.5 | 36 | 96.8 | 1.5 |
| 6 | NaH₂PO₄ | 5.0 | 36 | 97.2 | 0.9 |

Examples 7 to 11 show the influence of residence time on the formation of tetrahydrofuran as by-product.

EXAMPLES 7 TO 11

TABLE 2

| E | Catalyst T | Am (percent) | RT (min.) | Yield (percent) BDF | THF |
|---|---|---|---|---|---|
| 7 | KHSO₄ | 0.25 | 118 | 95.7 | 1.05 |
| 8 | KHSO₄ | 0.25 | 203 | 94.8 | 1.7 |
| 9 | KHSO₄ | 0.25 | 400 | 91.3 | 5.6 |
| 10 | K(Al(SO₄)₂) | 3.0 | 100 | 94.6 | 1.9 |
| 11 | K(Al(SO₄)₂) | 3.0 | 137 | 91.9 | 4.7 |

We claim:

1. In a process for the production of 1,4-butanediolformal wherein a mixture of butanediol-1,4, an aqueous solution of formaldehyde or a substance yielding formaldehyde, and an acid or acid salt is heated in a reaction vessel, the improvement which comprises continuously
    (a) heating at the boil a constant amount of said reaction mixture which contains less than 1% by weight of a strong acid or less than 10% by weight of an acid salt or a weak acid,
    (b) evaporating the product of the synthesis from the reaction mixture at such a velocity that a mean residue time in the reaction vessel of less than 240 minutes is set up for the reaction mixture,
    (c) condensing the vapors of the product of the synthesis,
    (d) separating the two layers which form in the liquid condensate,
    (e) subjecting the upper layer to treatment with alkali, passing said layer through an evaporator and thereafter fractionally distilling said treated layer, and
    (f) subjecting the lower layer to azeotropic distillation and recycling the the distillate to the uncondensed product stream which leaves the reaction vessel.

2. A process as in claim 1, wherein the reaction mixture contains from 0.005 to 0.5% by weight of a strong acid.

3. A process as in claim 1, wherein the reaction mixture contains from 0.1 to 5% by weight of a weak acid or an acid salt.

References Cited

FOREIGN PATENTS 394,678    6/1933    Great Britain _____ 260—338

OTHER REFERENCES

Dexter B. Pattison: Jour. Org. Chem., Vol. 22 (1957), pp. 662–664.

Laurent, P. A. et al.: Rev. Port. Quim. 11(1) (1959), pp. 17–28.

NORMA S. MILESTONE, Primary Examiner